United States Patent
Bobst

Patent Number: 5,772,805
Date of Patent: Jun. 30, 1998

[54] WHEEL SAFETY RIM

[76] Inventor: Glen L. Bobst, 2910 North St. Helena Hwy., St. Helena, Calif. 94574

[21] Appl. No.: 719,761

[22] Filed: Sep. 25, 1996

Related U.S. Application Data

[63] Continuation-in-part of Ser. No. 543,617, Oct. 16, 1995, abandoned.

[51] Int. Cl.$^6$ ................................................ B60C 17/04
[52] U.S. Cl. .......................................... 152/158; 152/520
[58] Field of Search ................................. 152/158, 520; 156/110.1, 394.1, 398; 81/15.3; 157/1.3; 254/50.1; 29/894.351, 894.352, 894.31

[56] References Cited

U.S. PATENT DOCUMENTS

| | | | |
|---|---|---|---|
| 816,354 | 3/1906 | McCarthy et al. | 157/1.3 |
| 2,508,069 | 5/1950 | Lowry | 157/1.3 |
| 2,986,189 | 5/1961 | Lindley | 152/158 |
| 3,025,898 | 3/1962 | Opel | 152/158 |
| 3,141,490 | 7/1964 | Lindley | 152/158 |
| 3,212,548 | 10/1965 | Drazin | 152/158 |
| 3,777,797 | 12/1973 | Anderson | 152/158 |
| 4,223,713 | 9/1980 | Ewing | 152/520 |
| 4,424,842 | 1/1984 | Trebaol | 152/520 |
| 4,854,356 | 8/1989 | Koutsoupidis | 152/520 |
| 5,341,861 | 8/1994 | Forte | 152/520 |
| 5,343,921 | 9/1994 | Kusner | 157/1.3 |

FOREIGN PATENT DOCUMENTS

| | | | |
|---|---|---|---|
| 982185 | 6/1951 | France | 57/1.3 |

*Primary Examiner*—Geoffrey L. Knable

[57] ABSTRACT

Three equally spaced contoured pads are installed around the center of the outer periphery of a conventional existing wheel rim. The pads are supported by brackets welded to the rim, and the contours of the pads form a circle when positioned correctly. The pads are flexibly moveable relative to the brackets to allow for instantaneous spin balancing during wheel rim rotation as occasioned by vehicle usage. In addition to spin balancing, the wheel safety rim functions to prevent a vehicle from riding on the wheel rim when an associated tire becomes deflated. Further provided is a specialized tool for facilitating the installation of the present device.

1 Claim, 5 Drawing Sheets

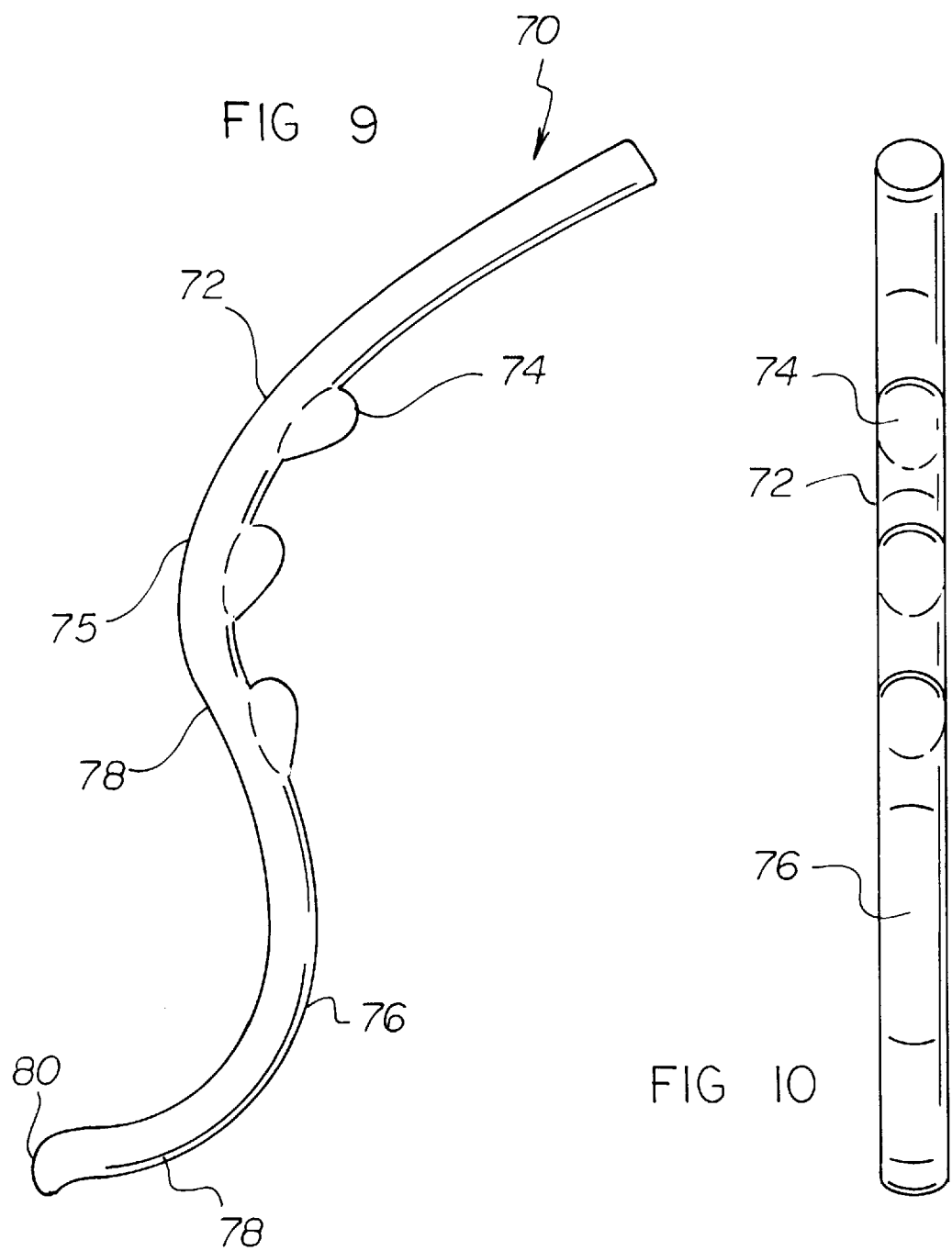

WHEEL SAFETY RIM

BACKGROUND INFORMATION

This application is a continuation-in-part of co-pending application filed Oct. 16, 1995 with Ser. No. 08/543,617, now abandoned.

BACKGROUND OF THE INVENTION

1. Field of the Invention

The present invention relates to pneumatic tires and rims used on vehicles, and more particularly pertains to a safety rim attachable about an existing wheel rim via a weld to facilitate the driving of a vehicle when a particular tire is in a deflated condition and further providing a tool and method to facilitate the installation thereof.

2. Description of the Prior Art

The use of safety support members around a wheel rim is generally well known in the prior art. For example, U.S. Pat. No. 4,173,243, which issued to Wilde et al. on Nov. 6, 1979, discloses a safety tire and wheel rim assembly which includes a safety support member positionable around a wheel rim. The support member effectively comprises a plurality of arcuate segments of rigid material coupled together at their ends and mounted in a channel-shaped bearing ring attached to the wheel rim, wherein the bearing ring is located against the tire beads to retain them in position. This patent is representative of the many different constructions illustrated in the prior art for achieving the function of wheel support during an unexpected deflation of an associated tire.

Another patent which illustrates a rigid safety support incorporated inside a tire and positionable about a wheel rim is U.S. Pat. No. 5, 363,894 which issued to Gouttebessis et al. on Nov. 15, 1994. The safety support member in this patent is in the shape of a continuous Z so as to be of an asymmetric shape which apparently improves stability upon intervention of the support.

While the two above-mentioned patents disclose rigid safety support members, a number of different constructions have also been directed to flexible safety support members, or at least combinations of flexible and rigid support structures. For example, U.S. Pat. No. 4,163,466, which issued to Watts on Aug. 7, 1979, discloses a safety support for mounting on a split rim inside a tire chamber so as to resiliently support the tread portion of the tire in a deflated condition. The safety support is of a complete polymeric flexible construction and is apparently operable for its intended function.

U.S. Pat. No. 4,823,854, which issued to Payne et al. on Apr. 25, 1989, and U.S. Pat. No. 4,481,997, which issued to Strader on Nov. 13, 1984, both illustrate rigid safety supports positionable around tire rims which have flexible topmost portions for engagement with an inner peripheral surface of a deflated tire. Apparently, the inventions shown in these patents would also function in the desired manner.

The safety support member according to the present invention substantially departs from the conventional concepts and designs of the crowded prior art, and in so doing provides a wheel safety rim structure that provides a total rigid support member to thus achieve the best maximum vehicle support during tire deflation, while also correcting for imbalance during tire rotation through the use of a flexible mounting system for the support member. In this regard, there has been difficulty employing the use of safety support members inside of pneumatic tires due to experienced tire and wheel vibration during high speed driving. Obviously, totally rigid support members are most desirable to support vehicle weight; however, imperfections in molding and design contributes significantly to wheel imbalance during rotation. By the same token, totally flexible support members can flexibly move in a spin balancing manner to offset imperfections in weight and shape, thereby correcting imbalance, but these members lack the required strength and rigidity to support vehicle weight for an extended driving period after deflation. As such, it can be appreciated that there exists a continuing need for new and improved wheel safety rims which provide substantial rigidity while overcoming wheel imbalance and in this regard, the present invention substantially fulfills this need.

In addition, there is a substantial need for a device as set forth hereinabove which may be retro-fitted to an existing wheel rim. Since retro-fitting such a device to an existing wheel rim may bring rise to problems such as installing the tire after the installation of one of the inventions described above, there is also a need for a method for making such a procedure feasible. The present invention further fulfills such needs.

SUMMARY OF THE INVENTION

In view of the foregoing disadvantages inherent in the known types of safety support rims now present in the prior art, the present invention provides an improved safety support rim construction wherein the same can be utilized to provide the necessary rigidity to support vehicle weight during tire deflation, while at the same time compensating for wheel and tire imbalance during high speed driving. As such, the general purpose of the present invention, which will be described subsequently in greater detail, is to provide a new and improved wheel safety rim apparatus and method of use which has all of the advantages of the prior art safety support rims and none of the disadvantages.

To attain this, the present invention generally comprises three equally spaced contoured pads installed around the center of the outer periphery of a conventional wheel rim. The pads are supported by brackets welded to the rim, and the contours of the pads form a circle when positioned correctly. The pads are flexibly moveable relative to the brackets to allow for instantaneous spin balancing during wheel rim rotation as occasioned by vehicle usage. Additionally, the wheel safety rim functions to prevent a vehicle from riding on the wheel rim when the associated tire becomes deflated. For allowing the convenient installation of the present invention, at least two unitary installation tools are included. Each of such tools has an S-shaped configuration with a first generally U-shaped portion. The first portion includes a plurality of protrusions formed along a first end thereof. A second U-shaped portion is provided with a pair of side members, one of which is integrally coupled to the first end of the first portion. Such side member has at least one protrusion formed thereon adjacent the protrusions of the first portion. Coupled to an end of one of the side members of the second portion is a third lip portion which resides distant the first U-shaped portion. It is imperative that the first portion, the second portion, and the third portion reside in a similar plane.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheel safety rim which has all the advantages of the prior art safety rims and none of the disadvantages.

It is another object of the present invention to provide a new and improved wheel safety rim which may be easily and efficiently manufactured and marketed.

It is a further object of the present invention to provide a new and improved wheel safety rim which is of a durable and reliable construction.

An even further object of the present invention is to provide a new and improved wheel safety rim which is susceptible of a low cost of manufacture with regard to both materials and labor, and which accordingly is then susceptible of low prices of sale to the consuming public, thereby making such wheel safety rim economically available to the buying public.

Still yet another object of the present invention is to provide a new and improved wheel safety rim which provides in the apparatuses and methods of the prior art some of the advantages thereof, while simultaneously overcoming some of the disadvantages normally associated therewith.

Still another object of the present invention is to utilize a weld to attach a safety rim about an existing wheel rim to facilitate the driving of a vehicle when a particular tire is in a deflated condition.

Another object of the present invention is to provide a tool and method to facilitate the installation of a safety rim to an existing wheel rim.

Lastly, it is an object of the present invention to provide three equally spaced contoured pads installed around the center of the outer periphery of a conventional existing wheel rim. The pads are supported by brackets welded to the rim, and the contours of the pads form a circle when positioned correctly. The pads are flexibly moveable relative to the brackets to allow for instantaneous spin balancing during wheel rim rotation as occasioned by vehicle usage. In addition to spin balancing, the wheel safety rim functions to prevent a vehicle from riding on the wheel rim when an associated tire becomes deflated. Further provided is a specialized tool for facilitating the installation of the present device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is a side elevational view of the tool of the present invention.

FIG. 10 is a front elevational view of the tool of the present invention.

Similar reference characters refer to similar parts throughout the several views of the drawings.

DESCRIPTION OF THE PREFERRED EMBODIMENT

Figure 1:
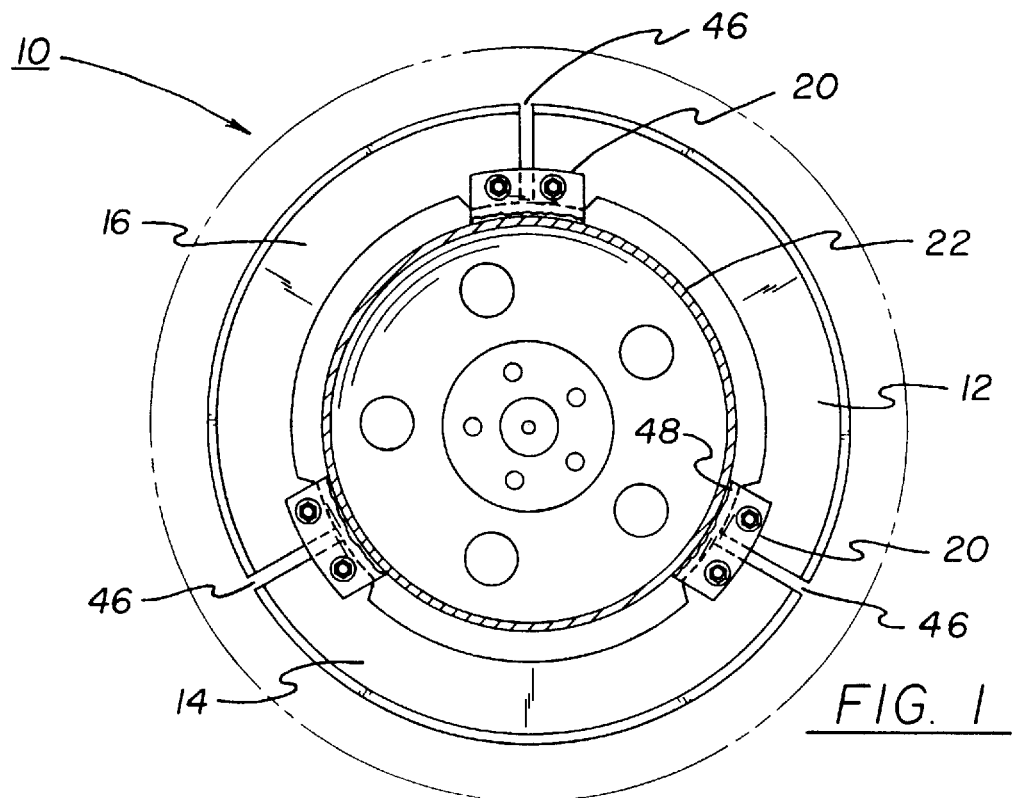
FIG. 1 is a cross sectional view of the wheel safety support rim comprising the present invention as viewed along line 1—1 of FIG. 2.
Figure 2:
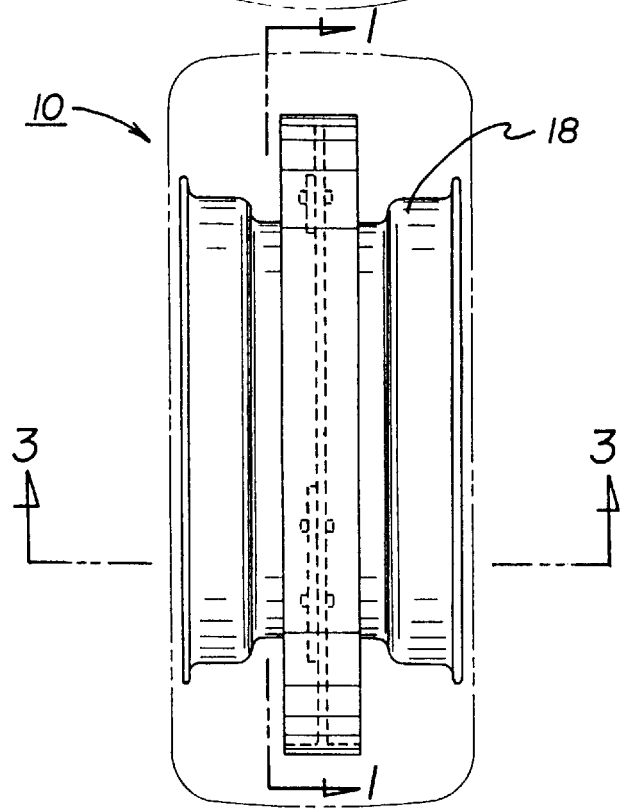
FIG. 2 is an end elevation view of the invention showing the same operably installed on a wheel rim.

With reference now to the drawings, and in particular to FIGS. 1 and 2, a new and improved wheel support rim embodying the principles and concepts of the present invention and generally designated by the reference numeral 10 will be described.

Figure 3:
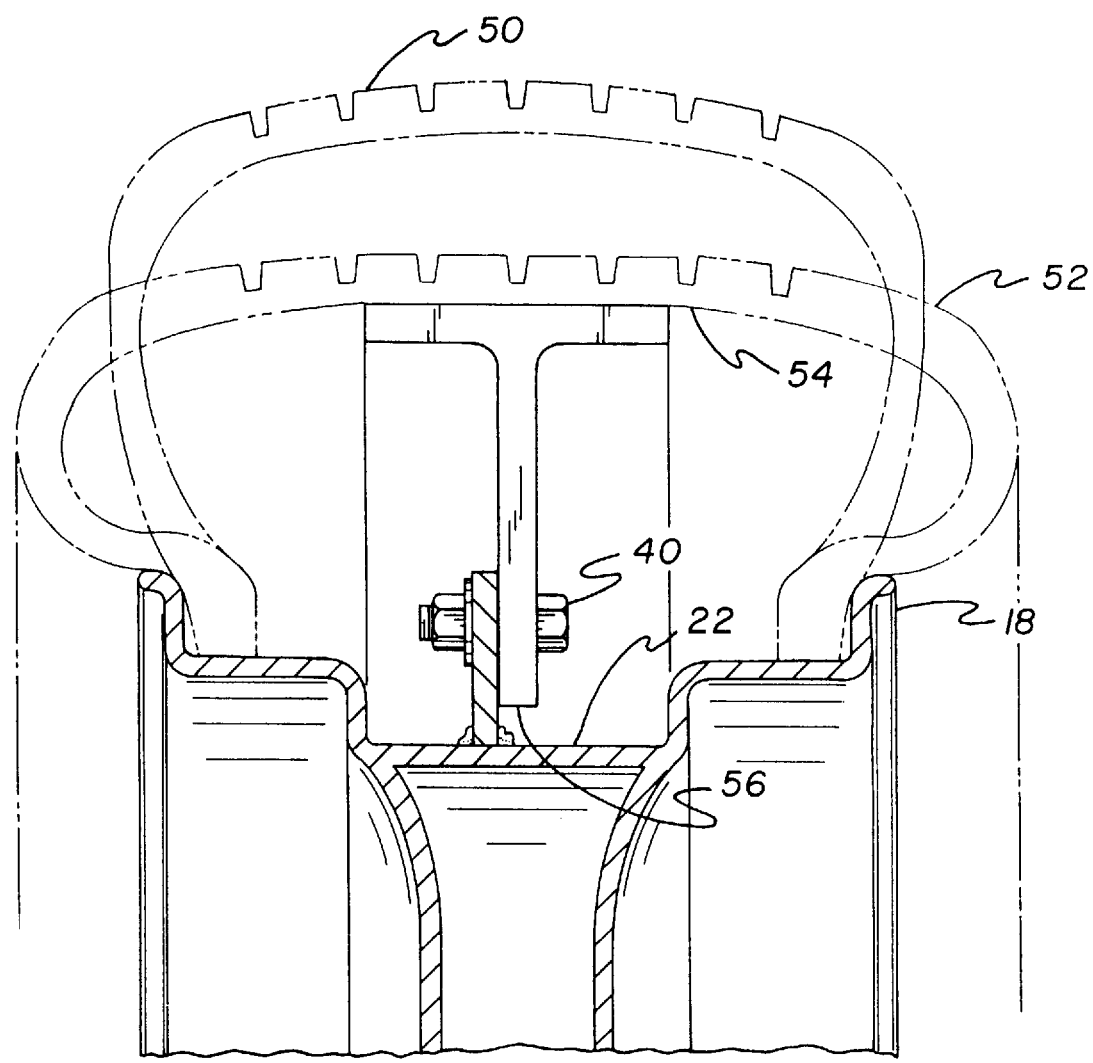
FIG. 3 is an enlarged cross sectional view of the invention as viewed along line 3—3 of FIG. 2.

More specifically, it will be noted that the wheel support rim structure 10 essentially comprises three arcuate rigid segments 12, 14, 16 which are coupled to an existing wheel rim 18 in a manner yet to be described so as to form a substantially complete circular support member. The three arcuate segments 12, 14, 16 are secured together by a plurality of pad support plates 20 each of which is welded to an outer surface 22 of the wheel rim 18 as best illustrated in FIG. 3. The pad support plates 20 are spaced one hundred and twenty degrees apart around the circumferential surface of the wheel 18 and the pads 12, 14, 16 are then interconnected therebetween as best illustrated in FIG. 1.

Figure 4:
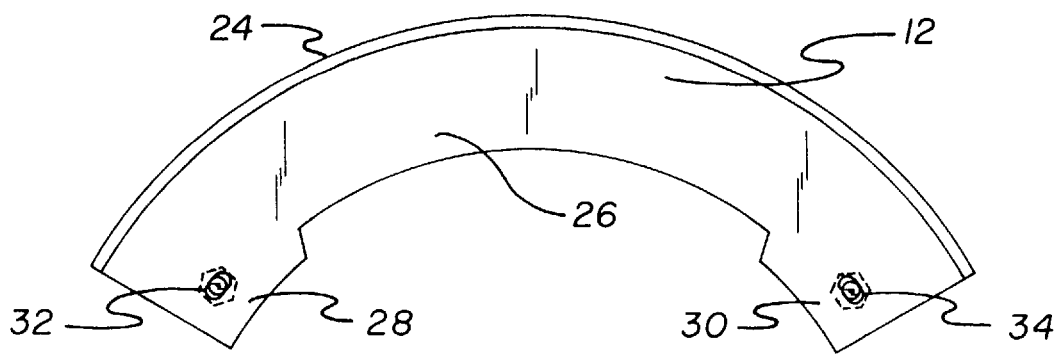
FIG. 4 is a side elevation view of one of the arcuate pads forming a part of the present invention.
Figure 5:
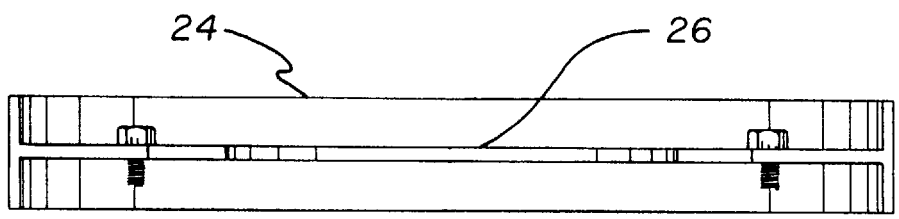
FIG. 5 is a bottom plan view of the pad shown in FIG. 4.

FIGS. 4 and 5 illustrate one of the arcuate segments 12 with this segment being identical in construction to the segments 14, 16. As can be seen, the segment 12 is circularly shaped in approximately a one hundred and twenty degree arc and is of an elongated T-shape. The integral outer portion of the segment 12 effectively comprises an arcuately shaped pad member 24 which is engageable with an inner surface of a deflated tire during intervention therewith. Extending downwardly from the pad member 24 is an integral support rim 26 having downwardly extending engagement tabs 28, 30 on opposed ends thereof, each of which is attachable to a pad support plate 20. The engagement tabs 28, 30 have respective elongated threaded member receiving slots 32, 34 which allow for some adjustable movement of an arcuate pad 12, 14, 16 about the peripheral surface 22 of the tire rim 18.

Figure 6:
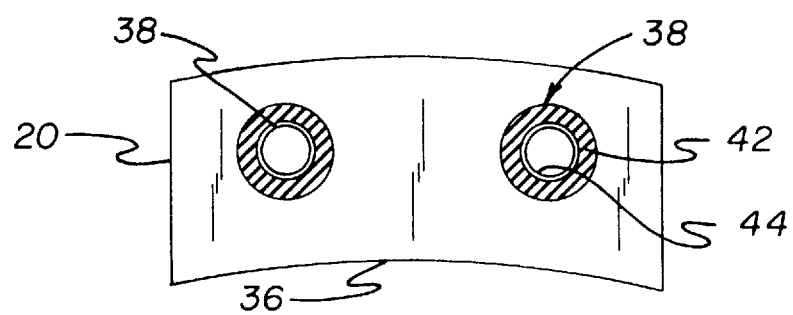
FIG. 6 is a side elevation view of one of the pad support plates forming a part of the present invention.
Figure 7:
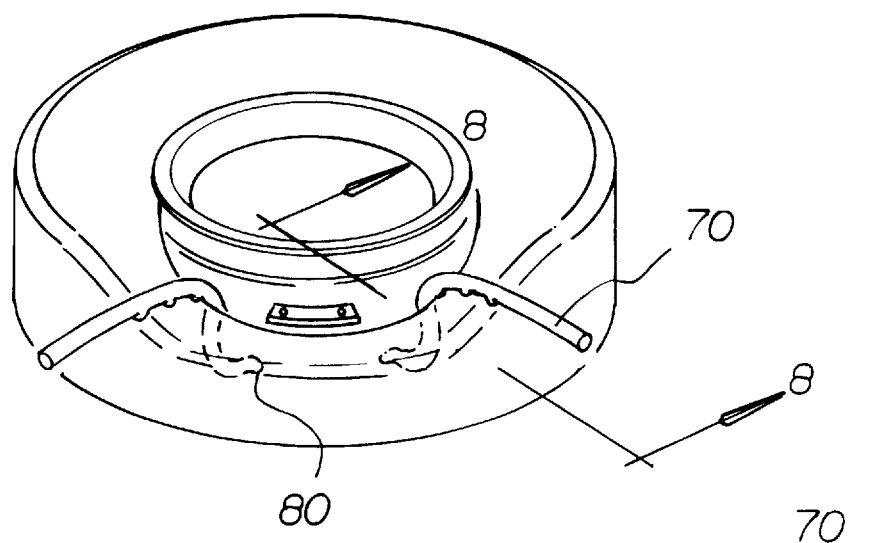
FIG. 7 is a perspective view of the tool of the present invention in use according to the method associated therewith.
Figure 8:
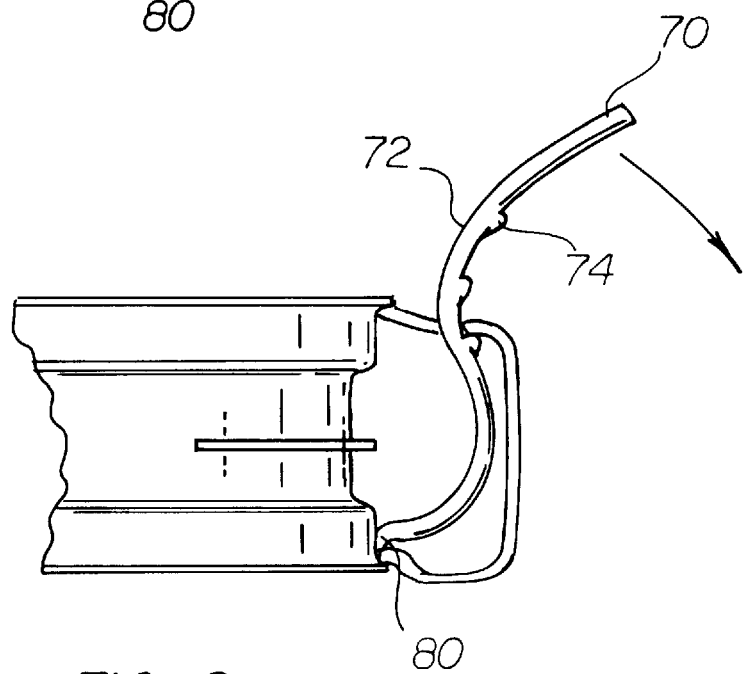
FIG. 8 is a cross-sectional view taken along the line shown in FIG. 7.

FIG. 6 illustrates one of the pad support plates 20, and it can be seen that the pad support plate includes a bottom arcuate surface 36 to facilitate a desired fit against the surface 22 of the wheel rim 18 prior to a welding thereof to the rim. Each pad support plate 20 includes a pair of apertures 38 which are engageable with the engagement tabs of 28, 30 the arcuate segments 12, 14, 16 through the use of a threaded fastener, lock nut and washer combination 40 as shown in FIG. 3. Each aperture 38 further includes a cylindrically shaped rubber grommet 42 frictionally retained therein through which the threaded connector combination 40 is positioned. The rubber grommet 42 includes an interior metallic sleeve 44 through which the threaded connector 40 is actually positioned, and this metallic sleeve prevents rubber deterioration due to frictional movement between the operable components.

As best shown in FIG. 1, the arcuate segments 12, 14, 16 are attached to the pad support plates 20 so as to form the aforementioned support member as a substantially circular configuration, and each of the segments 12, 14, 16 is provided with a space 46 therebetween so as to allow for movement of the segments during wheel rotation. Additionally, it will be noted that each of the engagement tabs 28, 30 located on the arcuate segments 12, 14, 16 are provided with a space 48 above the rim surface 22 so as to allow radial movement of the segments during wheel rotation.

As to a further discussion of the manner of usage and operation of the present invention, the same should be apparent from the above description. However, a brief description thereof will be provided to facilitate a better understanding of the invention 10. In this regard, the invention 10 can be retro-fitted on an existing wheel rim 18 or can be attached at the time of wheel rim manufacture. With the pad support plates 20 welded around the surface 22 of the wheel rim 18, the arcuate support segments 12, 14, 16 can be attached in the manner illustrated is FIG. 1, and under normal conditions, the pad members are not utilized. When a tire 50, as shown in FIG. 3, moves into a deflated condition 52, the inner surface 54 of the tire comes into abutment with the respective pad members 12, 14, and 16 as illustrated. The ground surface of the road then applies a radial inward force on the arcuate segments 12, 14, 16 and if substantial displacement occurs due to the weight of the vehicle, a bottom surface 56 of each of the engagement tabs 28, 30 will come into abutment with the surface 22, thereby forming a rigid support of the vehicle relative to the wheel rim 18.

When a tire 50 is in an inflated condition as shown in FIG. 3, rapid rotation of the wheel rim 18 could result in vibration due to differences in size, shape, and weight of the arcuate segments 12, 14, 16. Due to the fact that the threaded bolt assembly 40 utilizes a locknut and is not compressibly tightened to retard relative movement between the segments 12, 14, 16 and the pad support plate 20, the arcuate segments can seek a balanced condition in a known manner as a result of being able to radially move in response to rubber grommet 42 displacement. Since the arcuate segments 12, 14, 16 are provided with spaces 46 therebetween, circumferential adjustment is available to effect balancing. Additionally, due to the spaces 48 beneath the engagement tabs 28, 30 on each arcuate segment 12, 14, 16, automatic radial adjustment also occurs to achieve the best possible balance during wheel rotation. As such, a rigid wheel support rim is provided to allow driving on a deflated tire 52 without damaging a wheel rim 18 with this support rim structure being self balancing to prevent wheel vibration during high speed driving.

As shown in FIGS. 7–10, at least two unitary installation tools 70 are included for installing the present invention. Each of such tools has an S-shaped configuration with a first generally U-shaped portion 72. The first portion includes a plurality of protrusions 74 formed along a first end 75 thereof. A second U-shaped portion 76 is provided with a pair of side members 78, one of which is integrally coupled to the first end of the first portion. Such side member has at least one protrusion formed thereon adjacent the protrusions of the first portion. Coupled to an end of one of the side members of the second portion is a third lip portion 80 which resides distant the first U-shaped portion. It is imperative that the first portion, the second portion, and the third portion reside in a similar plane.

The method associated with the present invention is afforded first by providing the foregoing components including a tire. Next, the-support plates are welded to an existing rim. After, the tire is situated on the rim according to conventional practice. Once the tire is installed, the third extent of a first tool is abutted adjacent an inboard edge of an outer surface of the rim within the tire. As such, the second portion extends over the support members. Similarly, the third extent of a second tool is abutted on an inboard edge of an outer surface of the rim within the tire, wherein the second tool is spaced from the first tool. The next step is comprised of inserting an outboard inner periphery of the tire above a predetermined protrusion of each of the tools. Which protrusion is utilized is dependent on the size of the tire. Next, the tool is utilized as a lever to gain access to the support members so that the support segments may be bolted to the support members in their operative positions. Finally, the tools are removed and the tire is inflated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheel safety assembly for use with an inflatable vehicle wheel, said assembly comprising three arcuate segments secured to an interior peripheral surface of an existing vehicle wheel rim, each of said arcuate segments extending radially outwardly from said interior peripheral surface of said vehicle wheel rim and being aligned in a balanced and symmetrical relationship, each of said arcuate segments further including arcuately shaped supporting surfaces engageable with an interior peripheral surface of a deflated vehicle tire, thereby to prevent a complete collapsing of said deflated vehicle tire so as to permit a vehicle to continue traveling on said deflated vehicle tire until a repair thereof can be completed the assembly further including a plurality of support plates each with a bottom arcuate surface welded to the vehicle wheel rim with elastomeric connectors and a pair of apertures formed in each of the support plates;

said elastomeric connectors situated within the apertures of the support plates and including a cylindrically shaped rubber grommet frictionally retained therein for permitting both circumferential and radial movement of said arcuate segments, thereby to achieve a precise balancing effect, wherein the grommets further include an interior metallic sleeve;

said arcuate segments each including an integral support rim extending downwardly from the support surfaces and having downwardly extending engagement tabs on opposed ends thereof each of which has a pair of elongated slots formed therein for allowing the coupling thereof with the elastomeric connectors of the corresponding support plates via a threaded fastener, lock nut and washer combination;

said arcuate segments each identically shaped and designed with a T-shaped cross-section, and further wherein each of said arcuate segments are equidistantly and spacedly positioned around said vehicle wheel to define a circular configuration;

said arcuate segments being relatively moveable with respect to said support plates during a rotational movement of said vehicle tire, thereby to facilitate said precise balancing effect; and at least two unitary installation tools each having an S-shaped configuration with a first generally U-shaped portion including a plurality of protrusions formed along a first end thereof; a second U-shaped portion having a pair of side members, one of which is integrally coupled to the first end of the first portion with at least one protrusion formed thereon adjacent the protrusions of the first portion; and a third lip portion integrally coupled to an end of one of the side members of the second portion which resides distant the first U-shaped portion, wherein the first portion, the second portion, and the third portion reside in a plane.

* * * * *